UNITED STATES PATENT OFFICE.

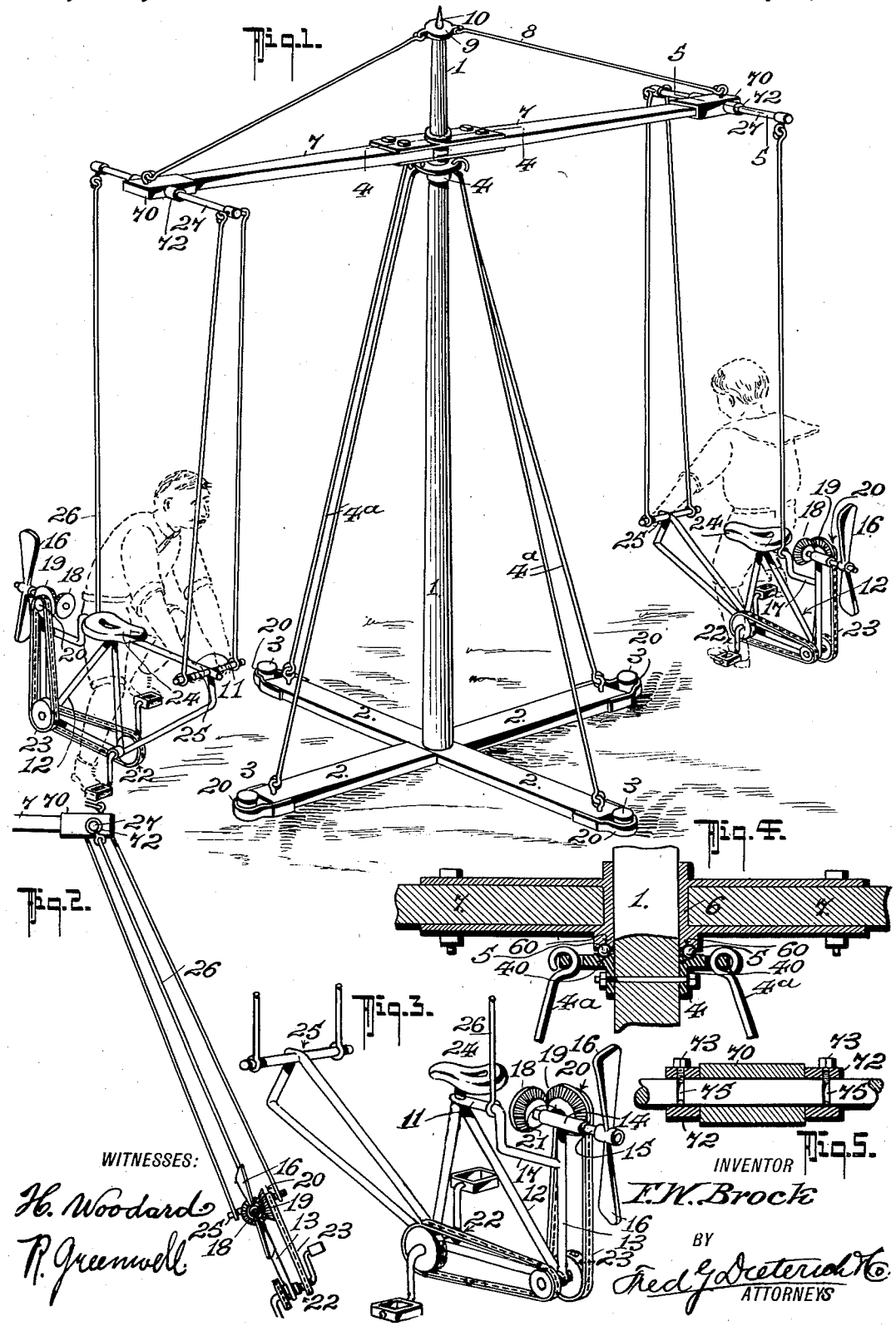

FRANK W. BROCK, OF CHATHAM, ILLINOIS, ASSIGNOR OF ONE-HALF TO DEAN A. CATO, OF CHATHAM, ILLINOIS.

AERO MERRY-GO-ROUND.

1,068,852.    Specification of Letters Patent.    Patented July 29, 1913.

Application filed April 19, 1912. Serial No. 691,843.

*To all whom it may concern:*

Be it known that I, FRANK W. BROCK, residing at Chatham, in the county of Sangamon and State of Illinois, have invented a new and Improved Aero Merry-Go-Round, of which the following is a specification.

My invention relates to improvements in carousels or merry-go-round apparatus, and it primarily has for its object to provide an improved construction of merry-go-round in which means are provided whereby the occupants of the car or cars may conveniently actuate the propelling power and the carousel or merry-go-round may be caused to turn about the central pole without the aid or expense of motor-driven mechanism.

My invention comprehends a passenger propelled carousel or merry-go-round of a simple and economical construction in which the several parts are coöperatively so combined that the entire structure may be easily propelled by any one, or more, of the occupants of the cars or carriages, and in which special provision is provided for properly sustaining the occupant of the car so that a uniform motion is imparted to the apparatus and the said occupant held from being accidentally thrown out of the car or carriage.

The invention consists in the novel construction and arrangement of the parts hereinafter fully set forth, specifically pointed out in the claims and illustrated in the accompanying drawings, in which:

Figure 1, is a perspective view of my improved merry-go-round. Fig. 2, is an elevation of one of the carriages or cars and its supports, the said carriage being shown as swung out, to the position it assumes during the movement of the apparatus. Fig. 3, is a perspective view of one of the carriages and a part of the suspension members connected therewith. Fig. 4, is a detail longitudinal section on the line 4—4 on Fig. 1. Fig. 5, is a detail cross section on the line 5—5 on Fig. 1.

In carrying out my invention, the mast or center post 1 is fixedly mounted upon a foundation, consisting of a pair of strong cross timbers 2—2, the ends of which have loops 20 for receiving the holding stakes 3—3.

4 designates a collar mounted upon and fixedly attached to the upper end of the mast to which connect the upper end of brace rods 4ª—4ª, the lower ends of which connect with eyes on the outer ends of the crossed timbers. The collar 4 has a ball race 40 to receive the bearing balls 5 that also move in a ball race 60 in the under side of a sleeve 6 rotatably mounted on the upper end of the mast and to which the radial supports or arms 7 are firmly attached in any well known manner, and which are braced by the rods 8 that connect with the outer ends of the said arms and to a metal turn plate 9 that turns upon a pin 10 in the upper end of the mast. The parts described are of a well known construction and form *per se* no part of my invention, the essentials of which I shall now proceed to describe.

From the outer end of each arm 7, is pendently supported a car or carriage, which in the showing made by me is in the nature of an ordinary bicycle frame and includes an upper horizontal seat bar 11, the triangular pendent framing 12, a rear vertically extended brace bar 13, the upper end of which has a hub 14, in which the shaft 15 of a propeller 16, turns. The rear end of the seat bar 11 includes a dropped portion 17 that is welded or otherwise made fast to the upper end of the bar 13.

The object for dropping the rear end of the bar 11 is to provide for mounting a bevel gear 18 on the inner end of the propeller shaft, for meshing with a drive gear 19 that forms a part of a chain gear 20 journaled in a bracket portion 21 mounted on the upper end of the bar 13 and which extends above the drop portion 17 of the bar 11.

22 designates the ordinary crank propelled chain drive and 23 a supplemental chain drive that connects the main chain drive 22 with the chain gear 20.

24 designates the seat post and seat and 25 the handle bar which, in my construction is rigidly mounted on the front end of the seat bar 11.

In the outer end of each of the sweep arms 7 is rockably mounted a cross arm 27 and to one end of each of said cross arms is swivelly connected a hanger rod 26, the lower end of which connects with the rear end of the bar 11 and to the other end of the said bar 27 is swivelly connected a pair of hanger arms 26 that join with the opposite ends of the handle bar portions 25 of the bicycle frame.

To provide against positioning the occupant at any, but the true circumferential position, with respect to the mast, or pole and hold the car against twisting or awry positioning, as it is speeded, the hanger or rocker arm 27 is fixedly held to its position at right angles to the sweep arm 7 on which it is suspended and for such purpose the outer end of the arm 7 has a long transverse sleeve bearing 70 that is fixedly mounted, relatively to the arm 7, in which the rocker arm 27 journals and for further holding the car to a desired safe position, the arm 27 is held from creeping longitudinally within the sleeve 70 by collars 72 which are clamped up against the ends of the sleeve 70 by the set screws 73 that engage the grooves 75 in the rocker arm 27, as shown.

From the foregoing description taken in connection with the drawings, the complete construction, the manner in which my improved apparatus is operated and its advantages will be readily understood.

In operation, the car or cars begin to swing outwardly, and as they do it is absolutely necessary, to reduce the danger of riding to the minimum, that both the cars and the rider maintain a proper relation to the post or mast as they are swung out by the centrifugal force.

By supporting the car in the manner stated, the said car and the rider will, by reason of the rockable support at the top and the rigid connections between the said support and the car frame, be held to the position that maintains the propeller in the desired circumferential path and for transmitting the maximum driving force.

What I claim is:

1. In an amusement apparatus of the character described, a mast, a sweep arm swivelly mounted on said mast to turn in a horizontal plane, a turn plate swivelly mounted on the mast above the arm, brace rods connecting said turn plate with the extremities of said arm, rods carried by said arms at the extremities of the same and projecting at right angles to the arm, a bicycle frame including a relatively rigid handle bar portion, suspending rods connected to the ends of said handle bar portion, and having their other ends connected with one end of a sweep arm rod, a suspending rod connected to the other end of said sweep arm rod and to said frame in back of the seat portion of the same, said frame including a seat portion and a seat mounted thereon, the said frame including a propeller carrying bearing, a propeller carrying shaft mounted in said bearing, and power transmitting mechanism for said propeller.

2. A mast, a sweep arm swivelly mounted on said mast, a swivel plate mounted on said mast above the sweep arm, bearing members carried by the ends of said sweep arm to which the said brace rods connect, rods rockably mounted in said bearing members for movement on their longitudinal axes, a bicycle frame, said bicycle frame including three points of suspension in fixed relation to each other, three suspending rods connected at said fixed points of suspension and having their other ends connected with said sweep arm rods whereby the vertical longitudinal plane of said frame will continuously include said sweep arm rod from which the frame is suspended regardless of the degree of inclination of the frame to a vertical plane, and propelling mechanism carried by the frame.

FRANK W. BROCK.

Witnesses:
W. I. ALDRICH,
JACOB JORDAN.